United States Patent [19]

Schepis

[11] Patent Number: 5,074,372
[45] Date of Patent: Dec. 24, 1991

[54] KNOCK DOWN MOTORIZED THREE-WHEELED VEHICLE

[75] Inventor: Marco Schepis, Toronto, Canada

[73] Assignee: Fortress Scientific Limited, Downsview, Canada

[21] Appl. No.: 439,450

[22] Filed: Nov. 20, 1989

[51] Int. Cl.$^5$ ...................... B62D 61/08; B62K 15/00
[52] U.S. Cl. ...................................... 180/208; 180/907
[58] Field of Search ...................... 180/208, 907, 908; 280/DIG. 5, 287; 292/228; 403/92, 95, 330

[56] References Cited

U.S. PATENT DOCUMENTS

| | | | |
|---|---|---|---|
| 1,621,630 | 3/1927 | Debus | 292/228 |
| 4,187,050 | 2/1980 | Barbee | 403/92 |
| 4,452,327 | 6/1984 | Mowat et al. | 280/DIG. 5 |
| 4,570,739 | 2/1986 | Kramer | 180/208 |
| 4,582,335 | 4/1986 | Paioli | 280/287 |
| 4,632,595 | 12/1986 | Schaeff | 403/92 |
| 4,909,525 | 3/1990 | Flowers | 180/908 |

Primary Examiner—Charles A. Marmor
Assistant Examiner—Karin Tyson
Attorney, Agent, or Firm—Reed Smith Shaw & McClay

[57] ABSTRACT

A vehicle primarily intended for use by a single individual is disclosed which includes front and rear frame members and a releasable interconnecting mechanism for selectively engaging and disengaging front and rear frame members to permit the unit to be broken down into at least two components for easy transportation and storage. The seat for the unit is mounted on the rear drive frame and includes a seat post rigidly connected to that frame.

1 Claim, 5 Drawing Sheets

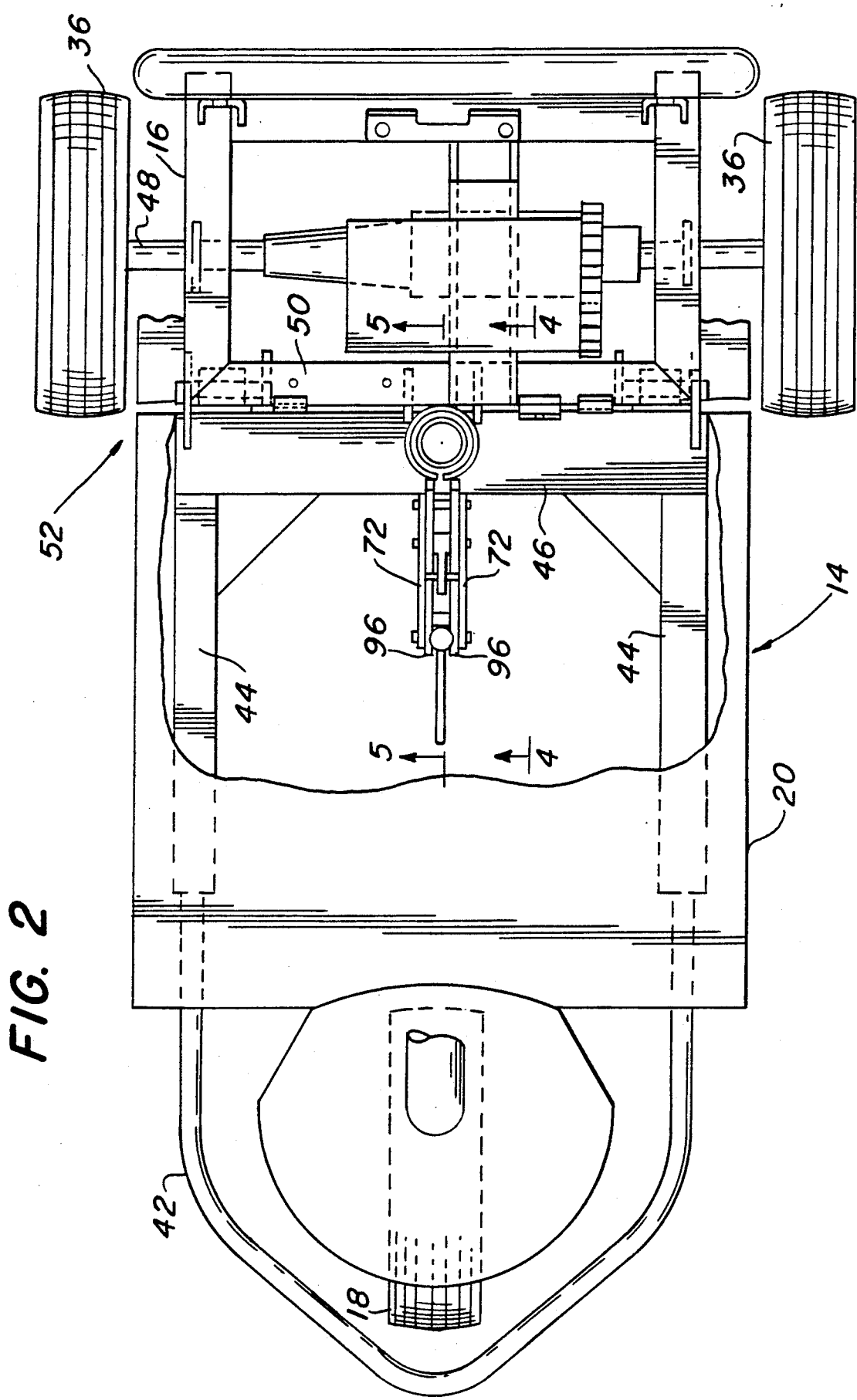

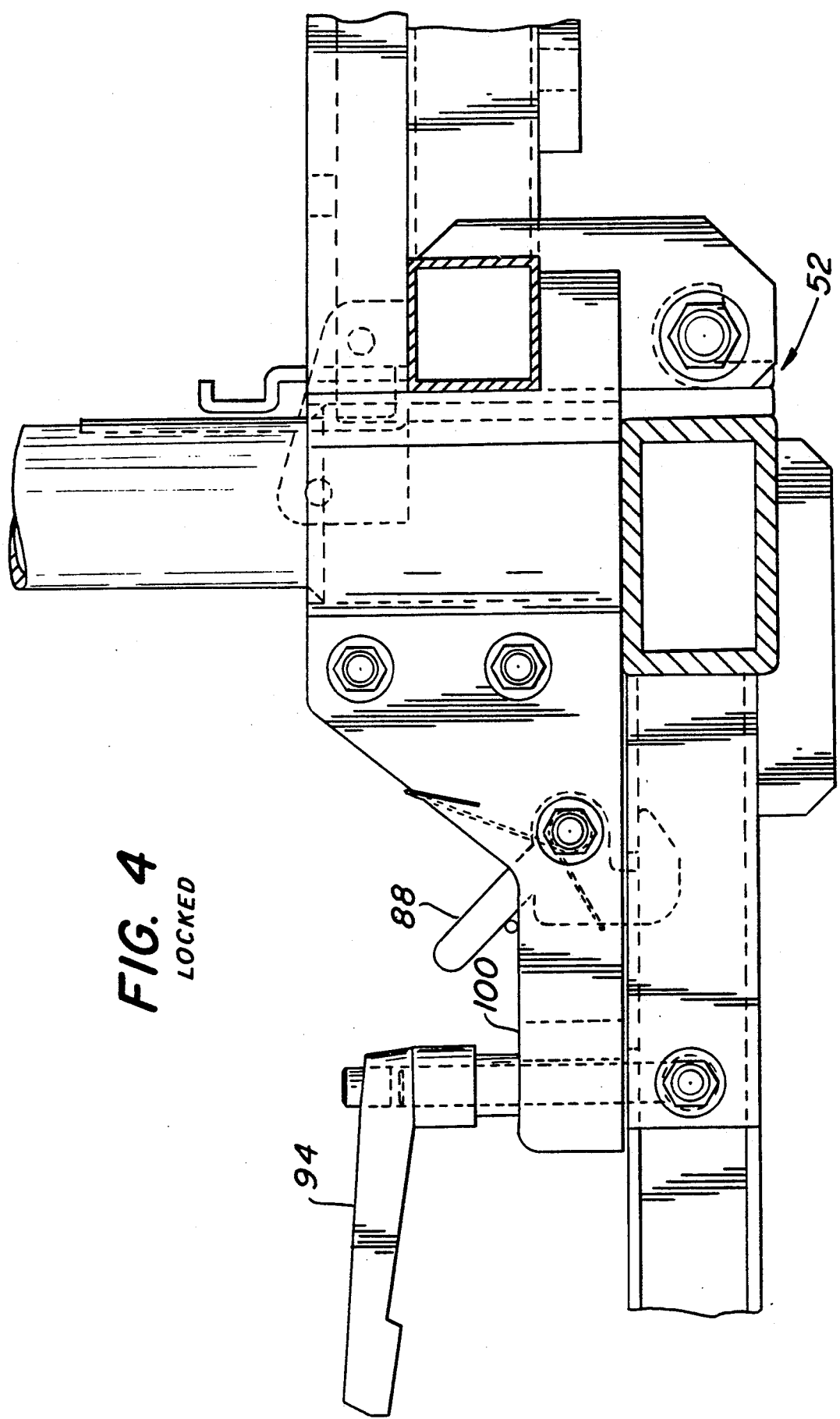

UNLOCKED—
PIVOTED—

SEPARATED

KNOCK DOWN MOTORIZED THREE-WHEELED VEHICLE

FIELD OF INVENTION

The present invention relates to a vehicle and more particularly to a self-propelled vehicle which is adapted to be separated into at least two components for ease of transport and storage.

BACKGROUND OF THE INVENTION

In recent years, with the aging of the population in this country and other countries, there has been an increased demand for vehicles which can be conveniently used by the elderly for personal transportation through stores, shopping malls, theme parks, or the like. Such vehicles are sometimes referred to as personal mobility vehicles and are generally used by those individuals who are not totally handicapped or require a traditional wheelchair for locomotion.

Personal mobility vehicles of this type are generally an outgrowth of prior small collapsible vehicles used for a variety of purposes, such as, for example, golf carts or the like. Some of these carts as have been previously proposed are disclosed, for example, in U.S. Pat. No. 3,388,761 to Arpen; U.S. Pat. No. 2,819,093 to Geiser; U.S. Pat. No. 3,249,171 to Kinghorn; and U.S. Pat. No. 3,117,648 to Landreth. Each of these prior art patents discloses a vehicle adapted to be ridden by one or more persons and also adapted to be broken down into components for ease of transportation, storage or repair.

The ability to conveniently separate a vehicle of the type with which the present invention is concerned into components is an important criteria particularly for the elderly. Such individuals may be capable of driving a conventional motor vehicle, and would like to transport their personal mobility vehicle in the back or trunk of their automobile. Since such people often lack full manual dexterity, for example because of arthritis, and since they may lack strength because of age, the ability to conveniently separate the vehicle into components so that individual components can be easily grasped and lifted into the automobile is an important consideration.

One such vehicle designed specifically for this purpose is disclosed in U.S. Pat. No. 4,570,739 to Kramer. That patent disclosed a lightweight vehicle capable of being broken down into components. However, the physical construction of the vehicle and particularly the releasable connecting arrangement therein is simplistic, and may not be durable in use. In addition, the arrangement requires a difficult alignment of a male and female connector, as well as alignment of holes in the front and rear frame elements to permit locking pins to be inserted therein. The manipulation of this vehicle needed to make these connections, even though the vehicle is of lightweight and inexpensive construction, may be more difficult than an elderly person with limited manual dexterity can cope with.

OBJECT OF THE INVENTION

It is an object of the present invention to provide a vehicle which is readily disassembled into at least two major components for ease of storage and transport.

Another object of the present invention is to provide a vehicle which is durable in construction and easy to assemble and disassemble, even by persons with limited manual dexterity.

A further object of the present invention is to provide a steerable driven personal mobility vehicle having an appropriate weight distribution to allow the vehicle to have substantial traction for climbing ramps and curbs.

Yet another object of the present invention is to provide a personal mobility vehicle which can be conveniently connected, assembled and disassembled into two components.

SUMMARY OF THE INVENTION

In accordance with an aspect of the present invention, a personal mobility vehicle is provided which includes a front frame and a separate rear drive frame adapted to be releasably connected to the front frame. The front frame has a transverse rear frame member located to be adjacent to and generally parallel to a front frame member on the rear frame when the front and rear frames are assembled to form a completed vehicle.

The front frame of the disclosed vehicle includes a steerable front wheel and the rear frame includes a pair of rear drive wheels, with drive means mounted on the rear frame for driving the rear drive wheels.

A pair of laterally spaced connecting pins are mounted on the front frame member of the rear frame to cooperate with a pair of hooks mounted on the rear frame member of the front frame when the frames are connected. The hooks and pins are located to releasably and pivotally engage each other for cooperation to prevent relative longitudinal movement to the frames in a first relative position, i.e., in the assembled position of the vehicle, while permitting longitudinal movement and separation of the frames when the frames are pivoted to a second relative position.

The front and rear drive frames include cooperating means, i.e., a releasable latch and a clamping arrangement, which selectively prevent pivotal movement of the front and rear frames relative to each other when the hooks and pins are engaged.

In order to improve the stability of the vehicle and to improve its traction, the seat arrangement for the vehicle is mounted on the rear drive frame. In one preferred embodiment, this seat arrangement consists of a split collar on the rear drive frame adapted to receive a seat support post. The split collar is designed to clampingly engage the seat post and hold it in position.

The above, and other objects, features and advantages of this invention will be apparent to those skilled in the art from the following detailed description of an illustrative embodiment thereof, when read in connection with the accompanying drawings, wherein:

BRIEF DESCRIPTION OF THE DRAWINGS

FIG. 2 is a plan view with parts removed or broken away of the front and rear frames of the vehicle of the present invention in their assembled configuration;

FIG. 4 is a sectional view taken along line 4—4 of FIG. 2 showing the connection between the front and rear frame members of the present invention;

DETAILED DESCRIPTION OF THE PREFERRED EMBODIMENT

Figure 1:
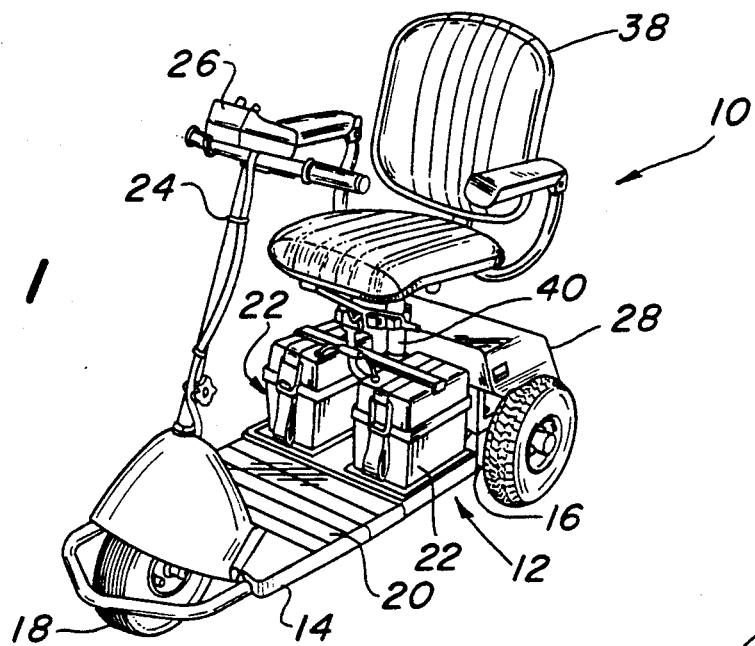
FIG. 1 is a perspective view of a vehicle constructed in accordance with the present invention.

Referring now to the drawings in detail, and initially to FIG. 1 thereof, a personal mobility vehicle 10 constructed in accordance with the present invention is illustrated. The vehicle includes a framework or carriage 12, defined by a front frame 14 and a rear drive frame 16. Front frame 12 includes a steerable front drive wheel 18 mounted on the frame in any convenient manner. The front frame also includes a foot support platform, deck or floor pan 20 on which a pair of batteries 22 are removably mounted in any convenient manner. A steering handle or tiller 24 is connected to the front wheel and includes a speed control console 26 mounted thereon.

Figure 3:
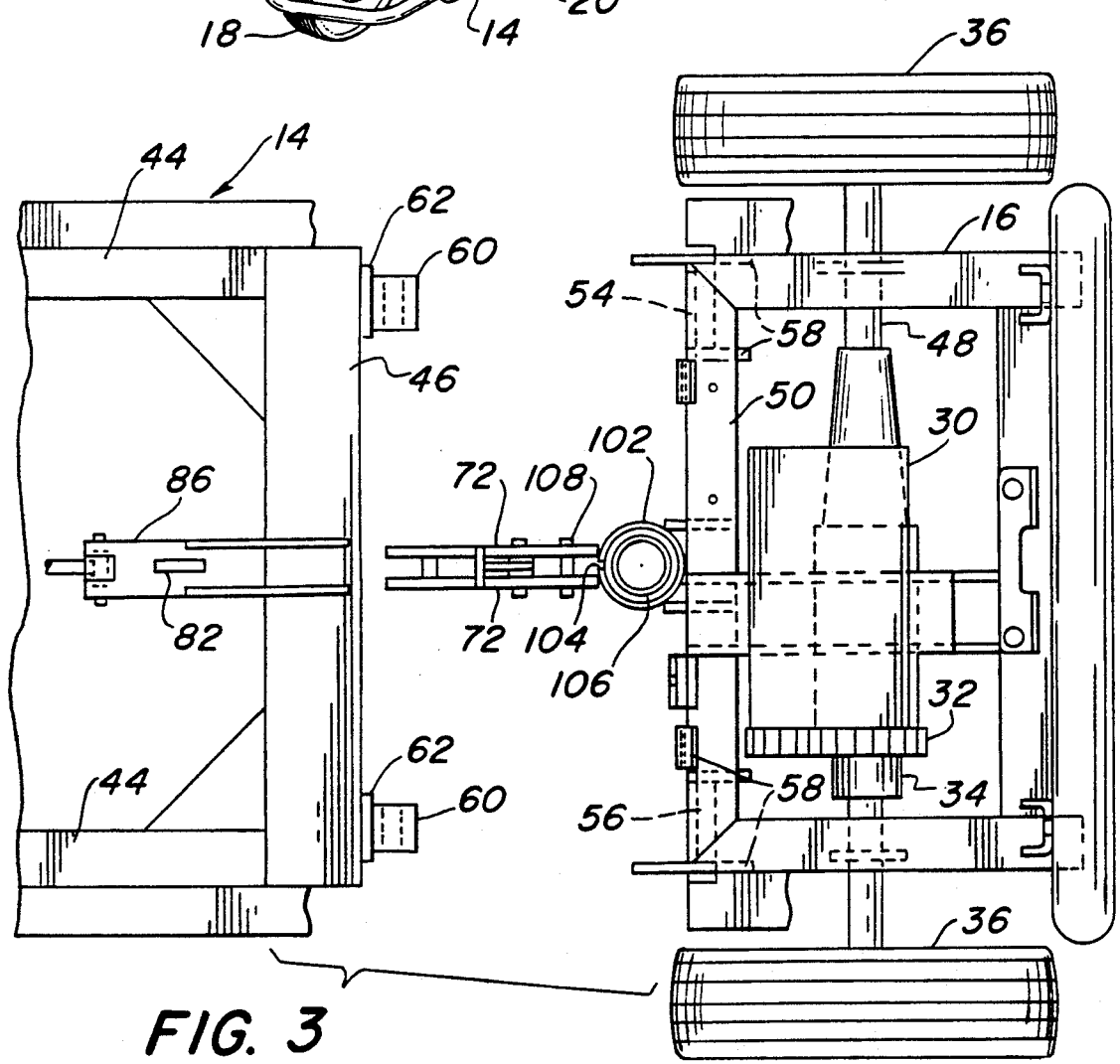
FIG. 3 is a partial view, similar to FIG. 2, showing the front and rear frames in their separated configuration.

Rear drive frame 16 includes a removable shroud 28 which encloses the drive motor 30 (FIG. 3). That motor is connected by a chain and sprocket arrangement 32 to a differential 34 which drives the rear drive wheels 36.

The basic control and drive mechanisms of the vehicle 10 are essentially identical to that of a personal mobility vehicle sold by Fortress Scientific Inc. under the trademark 2000FS. That product has been highly successful, but used a different and more complex connecting arrangement than that disclosed in the present application. Since that product, particularly with respect to the drive train, transmission, power supply and controls, has been on the market for several years and is well known to those skilled in the art, the details of the drive arrangement and controls need not be discussed here in detail.

In accordance with a feature of the present invention the vehicle 10 includes a seat 38 mounted in the vehicle for support on the rear drive frame 16. The seat is supported on a vertical support post 40, which is clampingly engaged on drive frame 16 as described hereinafter. This arrangement permits the installation of a power adjustable seat post as would be understood by those skilled in the art.

Referring now to FIGS. 2 and 3 in greater detail, front frame 14 includes a protective front bar 42 which guards front wheel 18 against impacts, serving essentially as a bumper. Bumper 42 is rigidly secured in any convenient manner to the side frame elements 44 of frame 14. At their rear end, frame members 44 are rigidly connected to a rear frame member 46 which extends transversely across the body of the vehicle. The foot support panel or floor pan 20 is mounted on and secured to frame members 44, 46 in any convenient (and preferably removable) manner.

Rear drive frame 16 is a rectangular structure as seen in FIGS. 2 and 3 on which axles 48 for drive wheels 36 are rotatably mounted in any convenient manner. The rear drive frame includes a front frame member 50, which extends transversely of the vehicle body. When the front and rear frames are connected to form the assembled vehicle, front frame member 50 of drive frame 16 is adjacent and generally parallel to the rear frame member 46 of front frame 14. These frame members are releasably connected by a releasable connection means 52, seen in greater detail in FIGS. 4-6.

Figure 5:
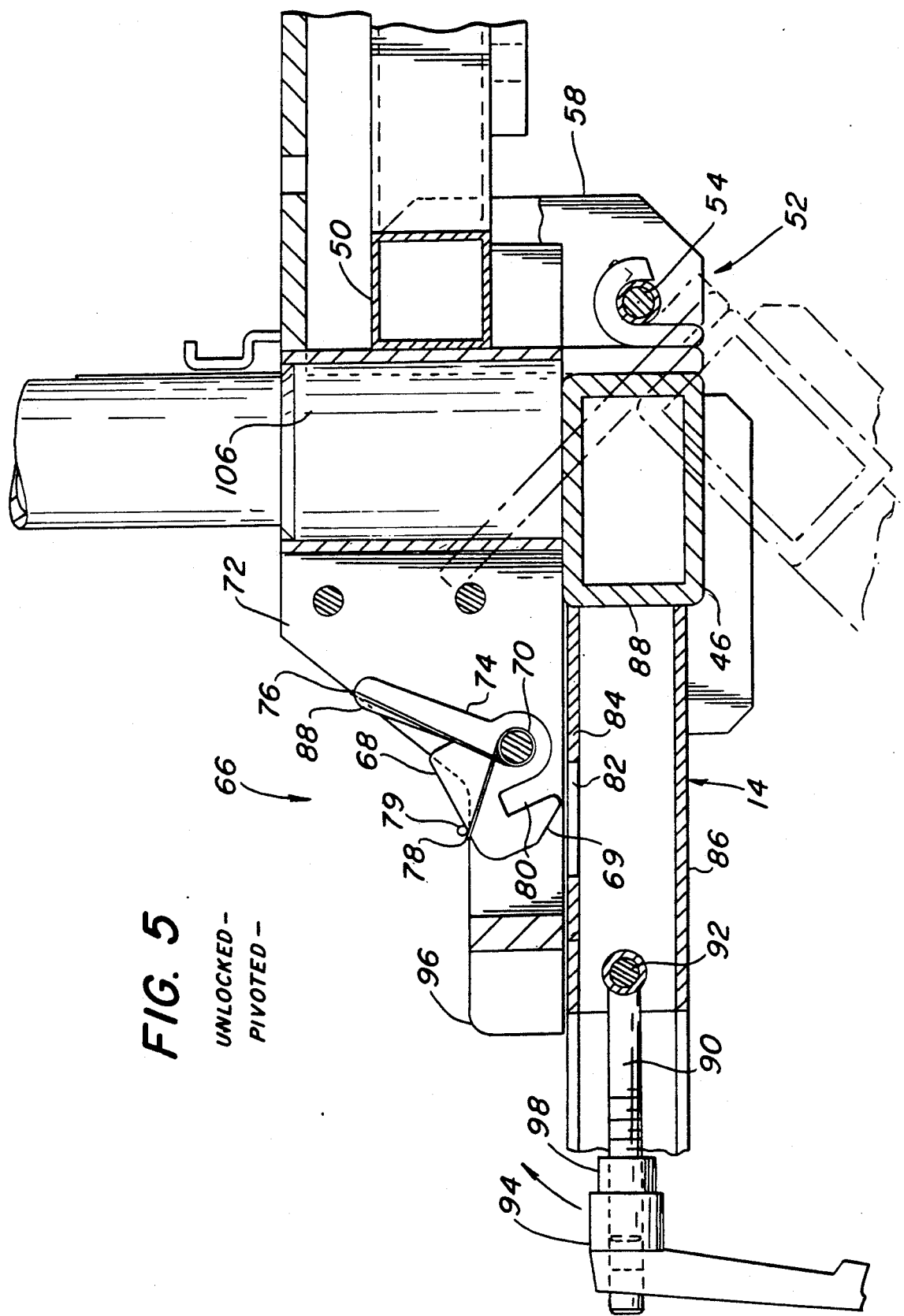
FIG. 5 is a sectional view taken along line 5—5 of FIG. 2 showing the configuration of the latch and clamp when released prior to pivotal movement of the frames for disconnection purposes, with the pivoted position of the front frame relative to the rear frame shown in dotted lines.
Figure 6:
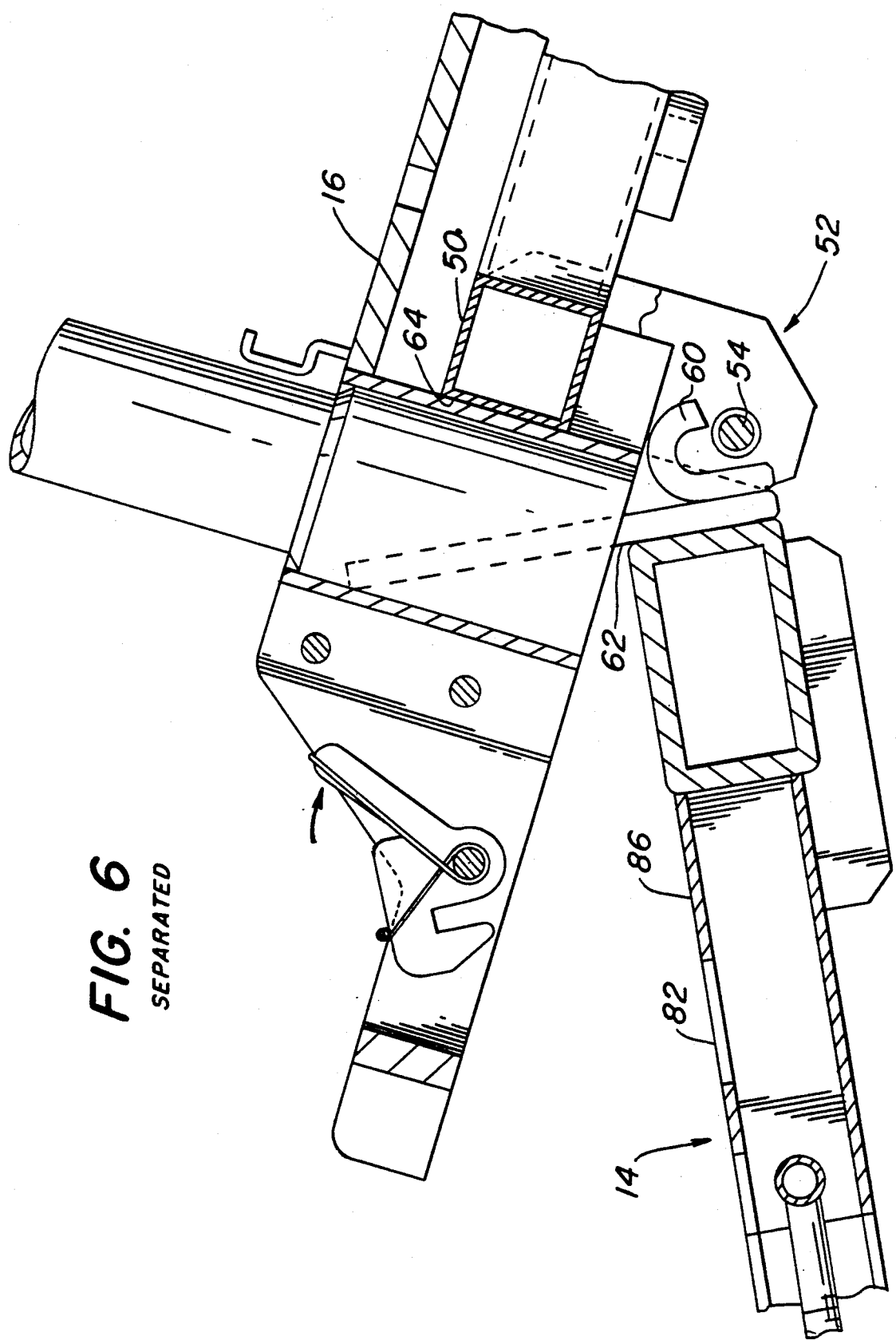
FIG. 6 is a sectional view similar to FIG. 5, showing the relative positions of the front and rear frames when they are being released from one another.

Releasable means 52 includes a pair of pins 54, 56 (see also FIG. 3) which are mounted beneath the frame member 50 by spaced tabs 58. Rear frame member 46 of front frame 14 includes a pair of hooks 60 mounted thereon in position to engage the pins 54, 56. These hooks are welded to vertical rectangular plates 62 which are in turn welded to the rear face of frame member 46. As seen in FIGS. 4-6, the hooks 60 have a generally inverted "J" shape so as to open downwardly. By positioning frames 14, 16 at an angle to each other, as seen in FIG. 6, hooks 60 may be engaged with pins 54, 56. Thereupon, by pivoting frame member 14 in a clockwise direction, as seen in FIG. 6, plates 62 will be brought into contact with the front face 64 of frame member 50, thereby preventing further clockwise rotation and causing the front and rear frame members to align with each other, with frame member 50 being parallel to and generally aligned with frame member 46, although in a slightly higher relative position, as seen in FIG. 5. In this position, frame members 14, 16, are held against longitudinal movement by the cooperation of hooks 60 with pins 54, 56.

In order to prevent undesired pivoting of frame 14 relative to frame 16, a latch arrangement 66 is provided. This latch arrangement includes a latch member 68 pivotally mounted on pin 70 between a pair of plate extension members 72 (see FIG. 3). The latch is biased to its latching position by a coiled spring 74 which is engaged at one end 76 with one of the plates 72 and at its other end 78 to the latch itself. Pivotal movement of latch 68 under the influence of spring 74 in the clockwise direction, as seen in FIG. 4, is limited by a pin 79 welded between plates 72.

Latch 68 has a hook-shaped recess 80 formed in its rearwardly-facing edge for engagement in a slot 82 formed in on the upper side 84 of a clamping tube 86 welded to the rear face 88 of frame member 46. As seen in FIG. 3, this tube 86 extends forwardly from frame member 46 beneath the plates 72 of the rear frame member. Latch 68 also has an inclined cam face 69. Thus, when frame member 14 is pivoted from the position shown in FIG. 6 to the position shown in FIG. 5, the latch enters the slot 82 in tube 86, and snaps into the latched position shown in FIG. 4. To release the latch, the user merely depresses the lever 88 of latch 68 in a clockwise direction, as seen in FIG. 5, to allow frame 14 to pivot in a counterclockwise direction to the dotted line position shown in FIG. 5 wherein the frames can be released from one another so that the unit is separated into two components.

In order to firmly secure frame members 14 and 16 together with additional rigidity beyond that provided by latch 68, a separate clamping arrangement is provided. This clamping arrangement includes a threaded rod 90 having a transverse T-portion 92 pivotally connected in any convenient manner within clamping tube 86. A clamping handle 94 is threadedly engaged in the outer end of rod 90 which can pivot on the T 92 from the position shown in FIG. 5 to the position shown in FIG. 4. By this arrangement when frame member 14 is pivoted into the operative position shown in FIG. 5, clamp rod 90 can be pivoted in a clockwise direction to the position shown in FIG. 4. In that position the rod is located between the free ends 96 of plates 72 (see also FIG. 2). Accordingly, the threaded handle 94 then can be turned down so that its bottom face 98 engages the upper surface 100 of the plate ends 96 to clamp the frame members together. This arrangement provides a rigid connection between the front and rear frames and eliminates and play in the connections formed by the latch or the hooks which might otherwise permit some slight relative movement between the front and drive frames.

Plates 72 are welded to a split collar 102 which is in turn welded in any convenient manner to frame member 50 of the rear frame 16. This split collar is generally circular in cross section as seen in FIG. 4 and FIG. 2 and has a slit 104 formed therein between the plates 72 which are welded respectively at either side of the slit. This collar receives the seat support post 106 for the seat 38. The fit between the seat support post and the interior of the collar is relatively tight, but to hold the seat post firmly in place, poles 108 are provided which, when tightened down squeeze the collar against the surface of the post 106 to firmly hold the post in position.

Accordingly, it is seen that a relatively simple connection and disconnection arrangement is provided in a personal mobility vehicle which requires a minimum of manual dexterity. The frame members are tightly clamped together by the operation of the relatively long and convenient to use clamp handle 94. When the clamp is released simple pushing on the lever arm 88 of the latch 68 releases the latch and permits the front frame member to be pivoted away from the rear frame to disconnect the hooks from the pins and thereby permit the two frames to be separated. As a result the vehicle is conveniently broken down into two major components for storage and transportation. As would be understood by those skilled in the art, the seat is also removable from the seat post if desired by a quick disconnect arrangement such as has been previously available on the market in the Fortress 2000FS product, so that the vehicle is broken down into three components making for easy storage in the trunk of an automobile.

While the present invention has been particularly shown and described with reference to a preferred embodiment, it will be understood by those skilled in the art that various changes and modifications may be made therein without departing from the spirit or the scope of the invention. It is intended that the appended claims be interpreted as including the foregoing as well as various other changes and modifications.

What is claimed:

1. A vehicle comprising a first frame and a second frame, means for releasably interconnecting said first and second frames, and a seat support post rigidly connected to said second frame adjacent said first frame and said releasably interconnecting means; said second frame including a pair of drive wheels and drive means for driving said wheels; a steerable front wheel on said first frame and means for steering said front wheel; said first and second frames including transverse frame members positioned immediately adjacent each other when said frames are connected and said releasably interconnecting means being mounted on said transverse frame members; said releasably interconnecting means including at least one pin mounted on one of said transverse frame members and at least one hook mounted on the other of said transverse frame members positioned to selectively pivotally engage said pin, said hook having an open bight facing downwardly to prevent longitudinal separation of the frames when the hook is engaged with the pin and said transverse frame members are adjacent each other and said first and second frames are connected and longitudinally aligned with each other, said hook being arranged to permit longitudinal separation of the frames when said transverse frame members are pivoted about the connection of the hook and pin through a predetermined angle; and releasable lock means for selectively preventing rotation of said frames relative to each other when said hook and pin are engaged; said lock means including a spring biased latch means cooperating between said first and second frames for latching the frames against pivotal movement and separate clamp means cooperating between said first and second frames for clamping the frames against pivotal involvement.

* * * * *